US010471793B2

(12) United States Patent
Kueppers et al.

(10) Patent No.: US 10,471,793 B2
(45) Date of Patent: Nov. 12, 2019

(54) SEAT MOUNTS FOR SIDE LOAD SPRING ON A TWIST BEAM AXLE

(71) Applicant: Ford Global Technologies, LLC, Dearborn, MI (US)

(72) Inventors: Theo Kueppers, Waldfeucht (DE); Andreas Carlitz, Stolberg (DE); Jens Glorer, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 240 days.

(21) Appl. No.: 15/291,439

(22) Filed: Oct. 12, 2016

(65) Prior Publication Data

US 2018/0099538 A1   Apr. 12, 2018

(51) Int. Cl.
*B60G 11/16*   (2006.01)
*B60G 21/05*   (2006.01)

(52) U.S. Cl.
CPC ............ *B60G 11/16* (2013.01); *B60G 21/051* (2013.01); *B60G 2200/21* (2013.01); *B60G 2202/12* (2013.01); *B60G 2204/1246* (2013.01)

(58) Field of Classification Search
CPC ............ B60G 11/16; B60G 2204/1246; B60G 2202/12; B60G 2202/136; B60G 2200/21; B60G 21/051; F16F 1/125; F16F 1/126
See application file for complete search history.

(56) References Cited

U.S. PATENT DOCUMENTS

| 2,576,824 | A | | 11/1951 | Bush |
| 2,770,468 | A | | 11/1956 | Willingham |
| 2,989,133 | A | | 6/1961 | Hodkin |
| 3,024,041 | A | | 3/1962 | Maruhn |
| 3,591,198 | A | | 7/1971 | Brando |
| 4,362,294 | A | * | 12/1982 | Schobbe .................. F16F 1/12 267/170 |
| 4,500,111 | A | | 2/1985 | Woo |
| 5,238,233 | A | * | 8/1993 | Hein ....................... F16F 1/371 180/312 |
| 5,421,565 | A | * | 6/1995 | Harkrader .............. B60G 11/16 267/153 |
| 5,467,970 | A | * | 11/1995 | Ratu ........................ B60G 7/04 267/152 |

(Continued)

FOREIGN PATENT DOCUMENTS

| CN | 1666896 A | 9/2005 |
| CN | 2906425 Y | 5/2007 |

(Continued)

*Primary Examiner* — Ruth Ilan
*Assistant Examiner* — Timothy Wilhelm
(74) *Attorney, Agent, or Firm* — Raymond Coppiello; Brooks Kushman, P.C.

(57) ABSTRACT

A vehicle includes a rear wheel suspension including a twist beam axle. The vehicle also includes upper and lower mounts for a spring and each defining a seat. The lower mount is disposed on the axle and the upper mount is disposed at a distance and parallel to the lower mount on a frame member. A first adapter is disposed within the lower mount seat and a second adapter is disposed within the upper mount seat. Each adapter defines a groove to receive an end of the spring, a support extending from the groove within an inner diameter of the spring and a wall disposed along a segment of the groove being configured to maintain a position of the spring.

11 Claims, 3 Drawing Sheets

(56) References Cited

U.S. PATENT DOCUMENTS

| | | | |
|---|---|---|---|
| 5,823,552 A | 10/1998 | Etnyre et al. | |
| 5,960,901 A | 10/1999 | Hanagan | |
| 6,149,171 A * | 11/2000 | Bono | B60G 11/16 280/124.179 |
| 6,199,882 B1 | 3/2001 | Imaizumi et al. | |
| 6,374,780 B1 | 4/2002 | Rutyna et al. | |
| 6,457,704 B1 * | 10/2002 | Van Eerden | B60G 11/52 267/166 |
| 6,460,840 B2 | 10/2002 | Imaizumi et al. | |
| 6,543,757 B2 * | 4/2003 | Imaizumi | B60G 11/14 267/179 |
| 6,644,933 B2 | 11/2003 | Light et al. | |
| 6,808,193 B2 | 10/2004 | Brandt et al. | |
| 7,392,978 B2 | 7/2008 | Carlitz et al. | |
| 7,416,175 B2 * | 8/2008 | Al-Dahhan | B60G 11/15 267/140 |
| 7,490,818 B2 * | 2/2009 | Kato | B60G 11/16 267/219 |
| 7,540,515 B2 | 6/2009 | Koumura | |
| 7,588,260 B2 | 9/2009 | Lopez et al. | |
| 7,624,973 B2 * | 12/2009 | Fader | B60G 11/15 267/179 |
| 7,631,882 B2 * | 12/2009 | Hirao | B60G 11/16 267/166 |
| 7,891,683 B2 | 2/2011 | Bitz et al. | |
| 8,061,690 B2 * | 11/2011 | Desprez | B60G 11/16 267/152 |
| 8,276,894 B2 * | 10/2012 | Dickson | B60G 11/52 267/116 |
| 8,590,911 B2 * | 11/2013 | Ehrlich | B60G 21/051 280/124.128 |
| 8,740,199 B2 * | 6/2014 | Takeda | F16F 1/125 267/179 |
| 9,079,474 B2 | 7/2015 | Lee et al. | |
| 9,234,555 B2 * | 1/2016 | Nakamura | F16F 1/122 |
| 9,604,516 B2 * | 3/2017 | Cha | B60G 11/16 |
| 9,610,820 B1 * | 4/2017 | Chen | B60G 3/18 |
| 9,950,583 B2 * | 4/2018 | Kaneko | F16F 9/3235 |
| 2001/0011791 A1 | 8/2001 | Hasegawa et al. | |
| 2001/0035601 A1 | 11/2001 | Imaizumi et al. | |
| 2003/0098448 A1 * | 5/2003 | Horst | B25B 27/304 254/10.5 |
| 2003/0111781 A1 | 6/2003 | Imaizumi | |
| 2005/0173882 A1 | 8/2005 | Drabon et al. | |
| 2005/0188717 A1 | 9/2005 | Aikawa et al. | |
| 2006/0049605 A1 | 3/2006 | Schuyten | |
| 2006/0131799 A1 | 6/2006 | Carlitz et al. | |
| 2006/0220338 A1 * | 10/2006 | Orimoto | B60G 3/20 280/124.141 |
| 2007/0045980 A1 | 3/2007 | Lopez et al. | |
| 2007/0052194 A1 * | 3/2007 | Marchel | B60G 21/051 280/124.166 |
| 2007/0069496 A1 * | 3/2007 | Rinehart | B21D 53/88 280/124.166 |
| 2007/0130501 A1 | 6/2007 | Fader et al. | |
| 2009/0134596 A1 * | 5/2009 | Takahashi | B60G 7/001 280/124.179 |
| 2010/0218528 A1 | 9/2010 | Yakumaru et al. | |
| 2010/0314933 A1 | 12/2010 | Jakob | |
| 2011/0248465 A1 * | 10/2011 | Carlitz | B60G 3/00 280/124.164 |
| 2012/0234995 A1 * | 9/2012 | Dietert | B60G 11/14 248/205.1 |
| 2015/0231939 A1 | 8/2015 | Yamamotoya et al. | |

FOREIGN PATENT DOCUMENTS

| | | |
|---|---|---|
| CN | 101218422 A | 7/2008 |
| CN | 101837719 A | 9/2010 |
| DE | 3108482 A1 | 9/1982 |
| DE | 3233878 A1 | 3/1984 |
| DE | 69908502 T2 | 5/2004 |
| DE | 102004058698 B3 | 2/2006 |
| DE | 102008045817 A1 | 3/2009 |
| DE | 102007051470 A1 | 4/2009 |
| DE | 102015200181 A1 | 7/2016 |
| EP | 0319651 A2 | 6/1989 |
| EP | 0930183 A1 | 7/1999 |
| EP | 1489370 A1 | 12/2004 |
| EP | 1574370 A1 | 9/2005 |
| FR | 2793734 A1 | 11/2000 |
| JP | H08142622 A | 6/1996 |
| JP | 2000351311 A | 12/2000 |
| JP | 2003211930 A | 7/2003 |
| JP | 2008239014 A | 10/2008 |
| WO | 2009124658 A1 | 10/2009 |

* cited by examiner

SEAT MOUNTS FOR SIDE LOAD SPRING ON A TWIST BEAM AXLE

TECHNICAL FIELD

This disclosure relates to spring seat components for a rear wheel suspension.

BACKGROUND

When a motor vehicle is cornering, considerable lateral forces are effectively at the wheel on the inside of the bend and on the outside, and these have to be absorbed by the rear wheel suspension or the components thereof. These lateral forces are absorbed by appropriate mounts or support bushings, and, on the one hand, these should be stiff enough to avoid over-steer. On the other hand, the mounts or support bushings should be flexible enough to enable appropriate ride comfort to be achieved.

A toe-out effect results from the compliance of the structural elements of the wheel suspension under the action of lateral forces during cornering. However, the compliance of the structural components and a toe-correcting movement of the axle lead to an unresponsive ride which is felt to be a disadvantage by the driver of the vehicle and the passengers in the vehicle. Hence, the individual components or structural elements of the rear wheel suspension should be designed to counter this compliance, i.e. to counter this yielding, that is to say their dimensions must be adapted. This entails an increase in weight, which has a disadvantageous effect on the weight of the vehicle, more specifically of the rear wheel suspension, if the thicknesses of material has to be adapted accordingly, for example. However, an increase in weight also means an increase in fuel consumption, for example.

SUMMARY

A rear wheel suspension includes a spring having an outer surface, and first and second ends. The rear wheel suspension also includes upper and lower mounts supporting the ends between a frame and axle, respectively. First and second adapters are secured to the mounts and associated with the ends. Each adapter includes a groove in contact with the outer surface, and a wall disposed along a portion of the groove such that the wall maintains the outer surface within the groove.

A vehicle includes a rear wheel suspension including a twist beam axle. The vehicle also includes upper and lower mounts for a spring and each defining a seat. The lower mount is disposed on the axle and the upper mount is disposed at a distance and parallel to the lower mount on a frame member. A first adapter is disposed within the lower mount seat and a second adapter is disposed within the upper mount seat. Each adapter defines a groove to receive an end of the spring, a support extending from the groove within an inner diameter of the spring and a wall disposed along a segment of the groove being configured to maintain a position of the spring.

A twist beam axle for a vehicle includes upper and lower mounts and first and second adapters. Each mount defines a seat to hold a spring having a centerline. The upper mount is disposed at a distance and parallel to the lower mount along the centerline. The first and second adapters are each associated with one of the mounts. The adapters are disposed on and secured to the seats and include a groove that receives an end of the spring, a support that extends along the centerline having a diameter equal to an inner diameter of the spring and a wall extending around a portion of the groove being parallel and concentric with the support. The spring is mounted having a tilt relative to a spring centerline between the upper and lower mounts.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
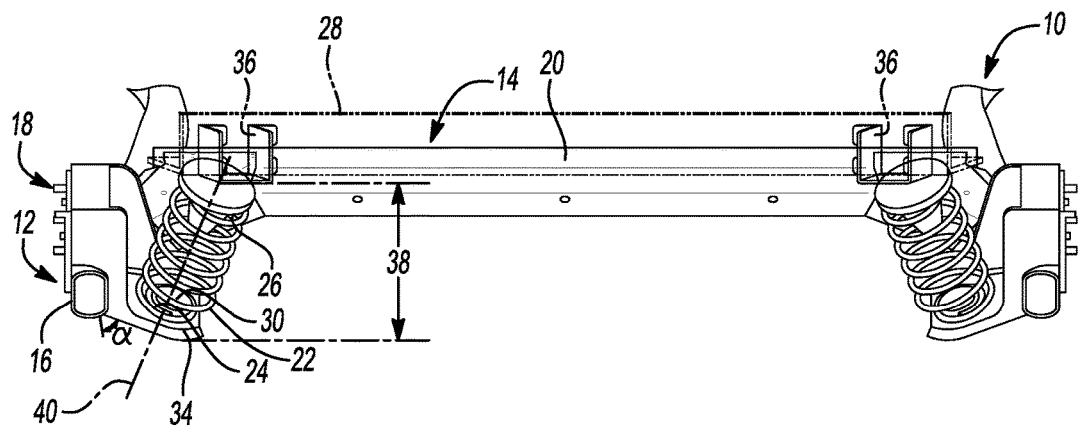
FIG. 1 shows a perspective view of a rear wheel suspension.

FIG. 1 shows a schematic view of a vehicle 10 having a rear wheel suspension 12, which is embodied as a semi-independent axle 14 by way of example. The semi-independent axle 14 has a longitudinal swing arm 16 assigned to each hub carrier 18. The longitudinal swing arms 16 are connected to one another by a profile 20. The longitudinal swing arms 16 and the profile 20, or other structural elements of the rear wheel suspension 12 can have a very wide variety of configurations. Arranged on the longitudinal swing arms 16 are support bushings (not shown). Each longitudinal swing arm 16 is assigned a spring 22, in the preferred embodiment a coil spring 22, which is supported at a first end 24 on the respective longitudinal swing arm 16 and at a second end 26 on a frame member 28 for the vehicle 10. The spring 22 is arranged in such a way that a force vector 30 of the spring 22 has an amount of tilt during an inward deflection relative to the longitudinal swing arms 16, which is different from an amount of tilt during an outward deflection relative to the longitudinal swing arms 16. The amount of tilt of the force vector 30 during an inward deflection is preferably greater than in the case of an outward deflection. As illustrated by way of example, the coil springs 22 on each side of the vehicle are oriented, or tilted toward one another in opposite directions away from the respective hub carriers 18. More specifically, the second end 26 of each spring 22 is tilted inward, or away from the respective hub carriers 18.

The coil spring 22 has a cylindrical outer surface 32. It is also possible for the coil spring 22 to be bent when mounted, or embody a C shape or S shape. It is also conceivable to provide different wire thicknesses of the coil spring 22. The illustrative embodiments are not intended to be limiting. As stated above, the spring 22 defines a tilt relative to the respective hub carrier 18 during an inward or outward deflection such that the coil spring 22 produces lateral forces that counteract the lateral forces of the wheels (not shown). Counteracting the lateral forces of the wheels relieves the load on the structural elements of the rear wheel suspension 12 by an amount corresponding to the lateral spring force without the need for additional components. Therefore, the lateral spring force is generated by the tilt of the spring 22, as described above, and the force vector 30 associated with the tilted coil spring 22. This allows the spring 22 to counteract the lateral forces of the wheels when the vehicle is cornering and enables the structural elements of the rear wheel suspension or semi-independent axle to be dimensioned with respect to reduced loads.

As will be described in more detail below, the coil springs 22 are disposed on lower and upper mounts 34, 36. The lower mounts 34 are attached to the longitudinal swing arms 16 at the hub carrier 18. As stated above, the upper mounts 36 are attached to the frame member 28. The spring 22 interconnects and is disposed between the lower and upper mounts 34, 36. The first end 24 of the spring 22 is disposed on the lower mount 34 and the second end 26 of the spring is disposed on the upper mount 36. Again, the spring 22 may define a tilt with respect to the hub carrier 18. In this way, the lower mounts 34, for example, may be set at an angle α relative to the longitudinal swing arms 16. In this embodiment, the lower mount 34 drifts substantially inward, or on the outside of the bend during cornering. As a result, a distance 37 between the upper mount 36 and the lower mount 34 decreases on the outside of the bend and compresses the spring 22. This has the effect that the force vector 30 is tilted such that the horizontal component (not shown) of the force vector 30 increases. In this way, the force vector 30 generates lateral forces that counteract the lateral forces of the wheel. Slanting the lower mount 34 may also allow a shift in the pressure point (not shown) in the lower spring lug (not shown) relative to a geometric spring centerline 40. In at least one other embodiment, the upper mount 36 may be set at an angle α relative to the longitudinal swing arms 16 to achieve the desired effects described above.

Figure 2:
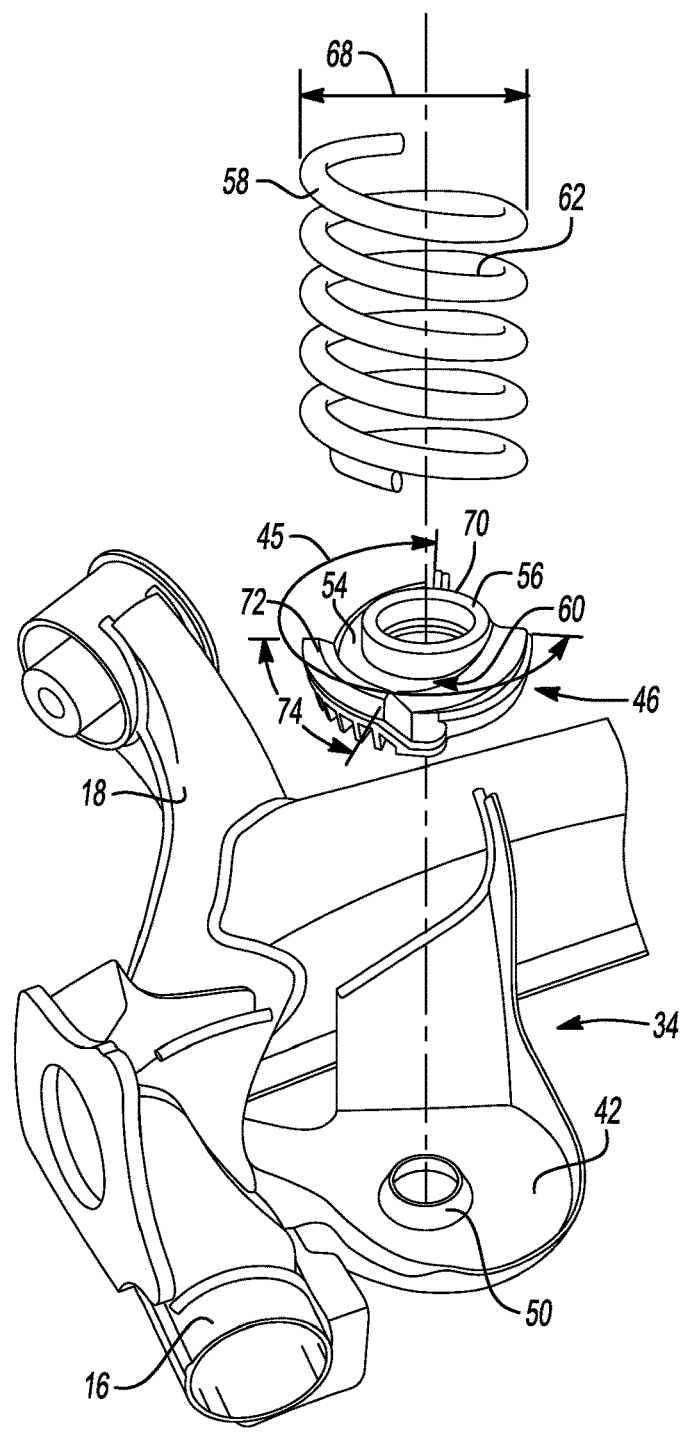
FIGS. 2 and 3 show exploded perspective views of the upper and lower mounts for a spring on a twist beam axle on the rear suspension.
Figure 3:
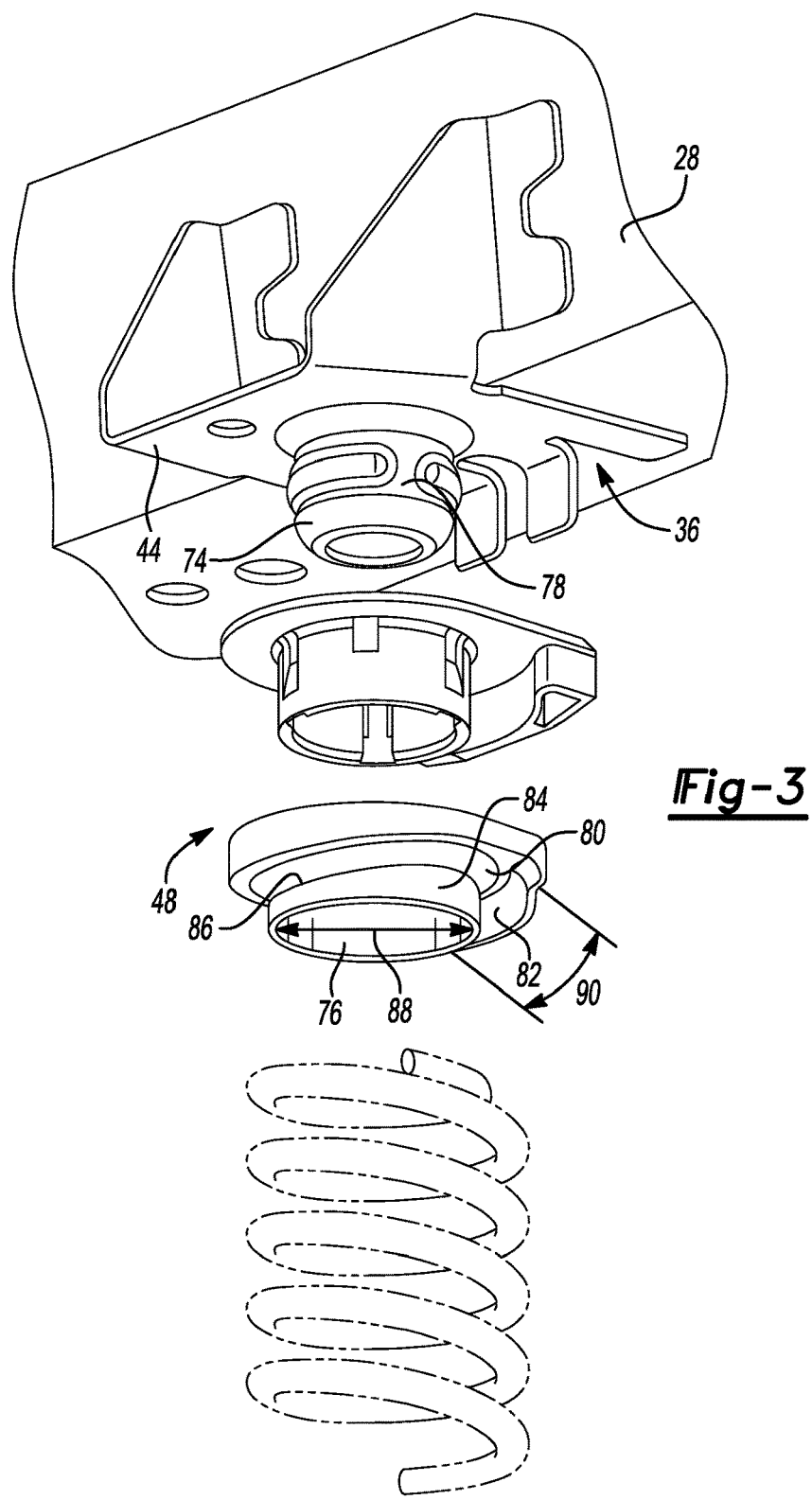

FIGS. 2 and 3 depict exploded perspective views of the lower mount 34 attached to the longitudinal swing arm 16 at the hub carrier 18 and the upper mount 36 attached to the frame member 28. Each of the lower mounts 34 and the upper mounts 36 further include seats 42, 44. Each of the lower mounts 34 and the upper mounts 36 also include first and second adapters 46, 48, respectively. The first adapters 46 are disposed on the lower mounts 34 at the seat 42 and the second adapters 48 are disposed on the upper mount 36 at the seat 44. As stated above, the spring 22 includes first and second ends 24, 26. The first end 24 attaches to the lower mount 34 via the first adapter 46 and the second end 26 attaches to the upper mount 36 via the second adapter 48. The first and second ends 24, 26 of the spring 22 are disposed within the seats 42, 44 of the lower and upper mounts 34, 36. Therefore, the first and second adapters 46, 48 are configured to secure and support the first and second ends 24, 26 of the spring 22 to the seats 42, 44 of the lower and upper mounts 34, 36.

Referring specifically to FIG. 2, an exploded perspective view of the lower mount 34 attached to the longitudinal swing arm 16 at the hub carrier 18 is depicted. As can be seen in FIG. 2, the first adapter 46 is attached to the lower mount 34 in the first seat 42. The first adapter 46 defines a substantially circular shape having a sector 45 of about 225°. The first adapter 46 is configured to be secured to the lower mount 34 in the first seat 42 by attaching to a first protrusion 50 extending vertically from the first seat 42 in a direction of the spring 22. The first adapter 46 may, therefore, define a bore 52 corresponding to the protrusion 50. For example, the protrusion 50 may be shaped slightly larger than the bore 52 and be designed to flex. Upon attaching the first adapter 46 to the first seat 42, the protrusion 50 will initially flex when inserted into the bore 52. After insertion, the protrusion 50 will expand and effectively lock the first adapter 46 to the first seat 42 on the lower mount 34. Locking the first adapter 46 to the first seat 42 prevents any misalignment that may occur during normal vehicle travel. In at least one other embodiment, the first adapter 46 may be locked to the first seat 42 on the lower mount 34 using fasteners, adhesive, welding or any other commonly known way of securing the first adapter 46 to the first seat 42 on the lower mount 34.

The first adapter 46 may include a groove 54 and a support 56. The groove 54 wraps around the support 56 and the support 56 extends vertically from the first adapter 46 in the direction of the spring 22. As stated above, the first adapter 46 may be configured to receive the first end 24 of the spring 22. Specifically, the first adapter 46 receives the first and 24 of the spring 22 within the groove 54. The groove 54 is disposed across an entirety of the first adapter 46, which extends around the protrusion 50 in a substantially circular sector. Therefore, the first end 24 of the spring 22 is secured to the first seat 42 of the lower mount 34 by fitting into the groove 54. In this way, the first adapter 46, via the groove 54, may aid to position the spring 22 in the manner described above. For example, by locking the first adapter 46 to the first seat 42 on the lower mount 34 and using the groove 54 to receive the first end 24 of the spring 22, the first adapter 46 may secure the spring 22 to the lower mount 34 with the tilt described above. Therefore, addition of the first adapter 46 allows for the advantages of the tilted spring 22 without requiring modification to the first seat 42 of the lower mount 34.

The groove 54 secures the spring 22 to the lower mount 34 by contacting an outer surface 58 of the spring 22. For example, the groove 54 is designed such that the first end 24 of the spring 22 fits into the groove 54 in which the outer surface 58 of the spring 22 mates with a contour 60 of the groove 54. Stated differently, an outer diameter 68 of the spring 22 fits into the groove 54. Mating the contour 60 of the groove 54 to the outer surface 58 of the spring 22 provides a flush engagement between the groove 54 and the first end 24 of the spring 22. The flush engagement between the groove 54 and the first end 24 of the spring 22 further aids to provide stability to the spring 22 when positioned in the first adapter 46. To mate the outer surface 58 of the spring 22 with the contour 60 of the groove 54, the groove 54 may decrease in depth along a perimeter 70 of the support 56. Therefore, the first adapter 46 may further include a wall 72 being concentric and extending parallel to the support 56. The wall 72 may be disposed along a portion 73 of the groove 54 defining the greatest depth in the first adapter 46. The wall 72 maintains the outer surface 58 of the spring 22 within the groove 54 and prevents the first end 24 of the spring 22 from sliding out of the groove 54 and off of the first adapter 46.

As stated above, the first adapter 46 may also include a support 56. The support 56 is disposed adjacent to the groove 54 and extends vertically away from the first seat 42, parallel to the spring centerline 40. As the groove 54 is designed to contact the outer surface 58 of the spring 22, the support 56 is designed such that the support 56 contacts the spring 22 at an inner circumference 62 of the spring 22. Stated differently, the support 56 defines a diameter 64 equal to an inner diameter 66 of the spring 22. By defining a diameter 64 equal to the inner diameter 66 of the spring 22, the support 56 further aids to maintain a position of the spring 22 within the lower mount 34. For example, by contacting the inner circumference 62 of the spring 22, the support 56 prevents the spring 22 from sliding out of the groove 54 in a direction opposite of the wall 72 and becoming misaligned on the first adapter 46. In this way, the groove 54, the wall 72 and the support 56 act to stabilize the first end 24 of the spring 22 on the first adapter 46 by supporting both the inner circumference 62 and the outer surface 58 of the spring 22.

By contacting the spring at two opposing points, being the outer surface 58 and the inner circumference 62 via the groove 54, the wall 72 and the support 56, the first adapter 46 allows the spring 22 to absorb the lateral forces during jounce and rebound as described above. Therefore, the groove 54, the wall 72 and the support 56 may cooperate to stabilize the first end 24 of the spring 22 to maintain the tilt of the spring 22 such that the force vector 30 of the spring 22 generates lateral forces sufficient to counteract the lateral forces due to cornering, described above. For example, the wall 72 and the support 56 may pinch the first end 24 of the spring 22 within the groove 54 to prevent horizontal axial movement of the first end 24 of the spring 22 within the first seat 42 of the lower mount 34. Stabilizing the first end 24 of the spring 22, via pinching between the wall 72 and the support 56 within the groove 54, allows the first adapter 46 to maintain the tilted position of the spring 22 that counteracts the lateral forces during jounce and rebound. Again, using the first adapter 46 allows the spring 22 to maintain the tilted position without requiring modification to the lower mount 34 or the first seat 42.

Referring specifically to FIG. 3, an exploded perspective view of the upper mount 36 attached to the frame member 28 is depicted. As can be seen in FIG. 3, the second adapter 48 is attached to the upper mount 36 in the second seat 44. The second adapter 48 defines a substantially circular shape. The second adapter 48 is configured to be secured to the upper mount 36 in the second seat 44 by attaching to a second protrusion 74 extending vertically from the second seat 44 in a direction of the spring 22. The second adapter 48 may therefore define a bore 76 corresponding to the second protrusion 74. The second protrusion 74 may further include a rib 78. The bore 76 of the second adapter 48 may be configured such that the bore 76 of the second adapter 48 slides over the second protrusion 74 and engages the rib 78. Engaging the rib 78 maintains a position of the second adapter 48 on the second seat 44 of the upper mount 36. For example, when the bore 76 of the second adapter 48 slides over the second protrusion 74, the second adapter 46 may flex when engaging the rib 78 to move the second adapter 48 past the rib 78. Therefore, once past the rib 78, the second adapter 48 will snap into position and be secured to the second seat 44 of the upper mount 36. The weight of the second adapter 48 is held by the rib 78 on the second protrusion 74. In at least one other embodiment, the second adapter 48 may be locked to the second seat 44 on the upper mount 36 using fasteners, adhesive, welding or any other commonly known way of securing the second adapter 48 to the second seat 44 on the upper mount 36.

The second adapter 48 may also include a groove 80, a wall 82 and a support 84. The groove 80, the wall 82 and the support 84 of the second adapter 48 may be different from the groove 54, the wall 72 and the support 56 of the first adapter 46. The second adapter 48 is configured to receive the second end 26 of the spring 22. In a manner similar to the first adapter 46, the second end 26 of the spring 22 fits within the groove 80 and is constrained by the wall 82 and the support 84. Again, the groove 80 wraps around the support 84 and defines a contour 86 that mates with the outer surface 58 of the spring 22 and the support 84 defines a diameter 88 equal to the inner diameter 66 of the spring 22 to stabilize the second end 26 of the spring 22 on the second seat 44 of the upper mount 36. Likewise, the wall 72 extends along a portion 90 of the groove 80 where the groove 80 is deepest. The groove 80, the wall 72 and the support 84 constrain the second end 26 the spring 22 such that misalignment of the spring 22 due to sliding of the second end 26 out of the groove 80 is prevented. Therefore, the second adapter 48 secures the spring 22 to the second seat 44 on the upper mount 36 with a tilt to counteract the lateral forces due to jounce and rebound, similar to the first adapter 46.

As will be described in more detail below, the first and second adapters 46, 48 may be oriented on the first and second seats 42, 44 such that the spring 22 is tilted as described above. For example, the wall 72 of the first adapter 46 and the wall 82 of the second adapter 48 may be oriented opposing each other to position the spring 22 in such a way that accounts for the lateral forces due to cornering, such as rebound and jounce. Constraining the first and second ends 24, 26 of the spring 22 such that the spring 22 is tilted between the upper and lower mounts 36, 34 allows the spring 22 to absorb the lateral forces exerted on the rear wheel suspension 12 by orienting the wall 72 of the first adapter 46 opposite of the wall 82 of the second adapter 48 to prevent the lateral forces from misaligning the spring 22 due to vehicle operation. Therefore, the first and second adapters 46, 48 may be affixed to the lower and upper amounts 34, 36 such that the first and second adapters 46, 48 oppose each other to orient the spring 22 with the tilted described above.

Figure 4:
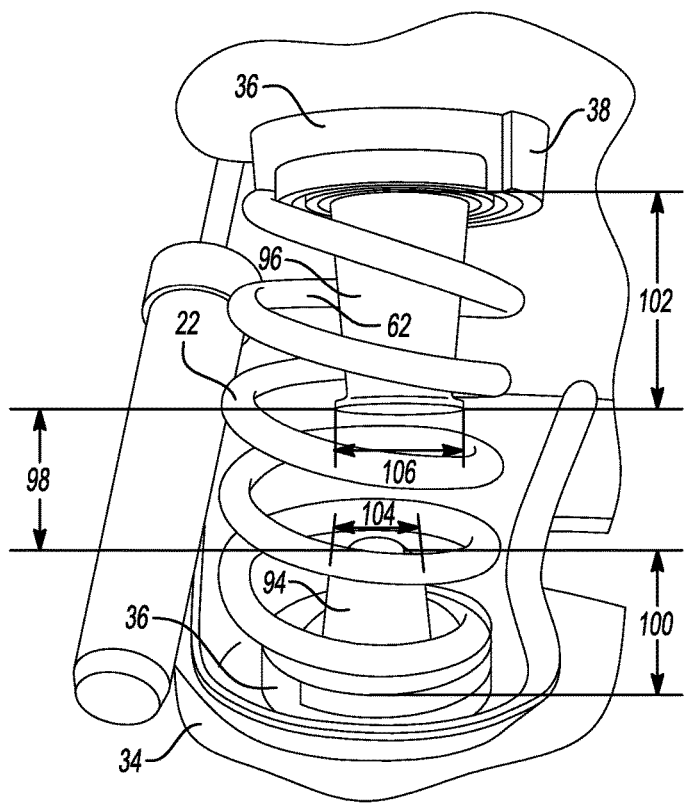
FIG. 4 shows a side load spring disposed within seats on the upper and lower mounts.

FIG. 4 depicts the spring 22 interconnecting the lower and upper mounts 34, 36 using the first and second adapters 46, 48 to orient the spring with a tilt. Each of the lower and upper mounts 34, 36 further include first and second guides 94, 96. The first guide 94 disposed on the lower mount 34 extends from the support 56. The second guide 96 is disposed on the upper mount 36 and extends from the support 84. The first and second guides 94, 96 are configured to damp jounce due to cornering. The first and second guides 94, 96 extend vertically along the spring centerline 40 and are disposed within the inner circumference 62 of the spring 22. Each of the first and second guides 94, 96 define a substantially frustoconical shape and are disposed in an opposite relation to each other.

The first and second guides 94, 96 may also be spaced at a distance 98 within the inner circumference 62 of the spring 22. The distance 98 may vary during vehicle travel and may vary specifically during vehicle cornering such as during jounce or rebound. For example, during jounce, the distance 98 between the first and second guides 94, 96 may be less than the distance 98 between the first and second guides 94, 96 during rebound. Therefore, the first and second guides 94, 96 may act as spacers such that the first and second adapters 46, 48 maintain the spring 22 in the tilted position between the lower and upper mounts 34, 36 described above. In this way, the first and second guides 94, 96 allow the spring 22 to be tilted such that the force vector 30 counteracts the lateral forces during jounce and rebound, as described above.

The first and second guides 94, 96 may further aid to maintain the tilted orientation of the spring 22 between the lower and upper mounts 34, 36. Therefore, the first and second guides 94, 96 may each define a length 100, 102, respectively such that the spring 22, the lower and upper mounts 34, 36, and the first and second adapters 46, 48 allow the force vector 30 of the spring 22 to counteract the lateral forces during jounce and rebound. Each length 100, 102 of the first and second guides 94, 96 may be designed or optimized such that a tilted position of the spring 22 is maintained throughout vehicle travel. For example, as stated above, the distance 98 between the first and second guides 94 during jounce may be less than the distance 98 between the first and second guides 94, 96 during rebound. The first guide 94 may define a length 100 based on the tilt and resulting force vector 30 of the spring 22 relative to the length 102 of the second guide 96 such that the lateral forces due to jounce and rebound during operation of the vehicle 10 are counteracted. Therefore, during jounce, the first guide 94 may contact the second guide 96 such that the distance 98 between the first and second guides 94, 96 is approximately zero.

Likewise, the first and second guides 94, 96 may also each define a width 104, 106, respectively. The width of each of the first and second guides 94, 96 may be based on the tilt and shape of the spring 22. For example, during rebound, the distance 98 between the first and second guides 94, 96 may be increased causing the spring 22 to bend. The widths 104, 106 of each of the first and second guides 94, 96 may be designed or optimized such that the tilt of the spring 22 and the force vector 30 are aligned to counteract the lateral force of the rebound. Therefore, each of the first and second guides 94, 96 may be configured to further maintain a tilted orientation of the spring 22 in the first and second adapters 46, 48 on the lower and upper Springs seats 42, 44 of the lower and upper spring mounts 34, 36, which allows the force vector 30 of the spring 22 to counteract the lateral forces during jounce and rebound as described above.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A rear wheel suspension comprising:
a spring having an outer surface, and first and second ends;
upper and lower mounts supporting the ends between a frame and axle, respectively; and
first and second adapters secured to the mounts and associated with the ends, each including a groove in contact with the outer surface, the groove decreasing in depth along a perimeter, and a wall disposed along a portion of the groove having the greatest depth such that the wall maintains the outer surface within the groove, wherein the wall and portion of the grove having the greatest depth of the first adapter opposes the wall and the portion of the groove having the greatest depth of the second adapter.

2. The rear wheel suspension of claim 1, wherein the spring is mounted at an angle between the upper and the lower mounts relative to a spring centerline.

3. The rear wheel suspension of claim 2, wherein the upper and lower mounts are disposed at an angle relative to the spring centerline.

4. The rear wheel suspension of claim 2, wherein the groove extends around the periphery of a support extending from the groove within an inner diameter of the spring.

5. The rear wheel suspension of claim 4, wherein the support extends vertically along the spring centerline and contacts the spring at the inner circumference to maintain a position of the spring within the mounts.

6. The rear wheel suspension of claim 4, wherein the support defines a cylindrical shape having a diameter equal to an inner diameter defined by the spring.

7. A vehicle comprising:
a rear wheel suspension including a twist beam axle;
upper and lower mounts for a spring and each defining a seat, the lower mount being disposed on the axle and the upper mount being disposed at a distance and parallel to the lower mount on a frame member; and
a first adapter disposed within the lower mount seat and a second adapter disposed within the upper mount seat, wherein each adapter defines a groove to receive an end of the spring, wherein the groove decreases in depth along a perimeter of a support extending from the groove within an inner diameter of the spring; and a wall disposed along a segment of the groove having the greatest depth and being configured to maintain a position of the spring, the wall and segment of the groove having the greatest depth of the first adapter opposes the wall and the segment having the greatest depth of the second adapter.

8. The vehicle of claim 7 further comprising a guide disposed within each of the upper and lower mounts, extending from the support and configured to damp jounce of the spring due to cornering.

9. The vehicle of claim 7, wherein the groove is defined such that an outer diameter of the spring fits into the groove.

10. The vehicle of claim 7, wherein the groove is defined around an entirety of the perimeter of the support.

11. The vehicle of claim 7, wherein the support contacts the spring at an inner circumference of the spring to maintain a position of the end of the spring within the groove.

* * * * *